United States Patent
Khrapko et al.

(10) Patent No.: US 11,921,366 B2
(45) Date of Patent: Mar. 5, 2024

(54) OPTICAL SYSTEMS COMPRISING MULTI-CORE OPTICAL FIBERS FOR REALIZING DIRECT CORE TO CORE COUPLING

(71) Applicant: CORNING INCORPORATED, Corning, NY (US)

(72) Inventors: Rostislav Radiyevich Khrapko, Corning, NY (US); Sukru Ekin Kocabas, Corning, NY (US); Robert Adam Modavis, Painted Post, NY (US); Daniel Aloysius Nolan, Corning, NY (US); Jun Yang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/295,512

(22) PCT Filed: Nov. 7, 2019

(86) PCT No.: PCT/US2019/060247
§ 371 (c)(1),
(2) Date: May 20, 2021

(87) PCT Pub. No.: WO2020/106463
PCT Pub. Date: May 28, 2020

(65) Prior Publication Data
US 2022/0026749 A1    Jan. 27, 2022

Related U.S. Application Data

(60) Provisional application No. 62/770,249, filed on Nov. 21, 2018.

(51) Int. Cl.
*G02F 1/125*      (2006.01)
*G02B 6/02*      (2006.01)

(52) U.S. Cl.
CPC ......... *G02F 1/125* (2013.01); *G02B 6/02042* (2013.01); *G02B 6/02095* (2013.01)

(58) Field of Classification Search
CPC ............ G02B 6/02042; G02B 6/02071; G02B 6/02095; G02F 1/3131; G02F 1/125; G02F 1/335
See application file for complete search history.

(56) References Cited

U.S. PATENT DOCUMENTS

| | | | | |
|---|---|---|---|---|
| 3,823,996 A | * | 7/1974 | Kompfner | G02B 6/02042 385/115 |
| 4,915,468 A | * | 4/1990 | Kim | G01D 5/344 385/28 |

(Continued)

FOREIGN PATENT DOCUMENTS

| | | |
|---|---|---|
| CA | 2190668 A1 | 5/1997 |
| CN | 1159002 A | 9/1997 |

(Continued)

OTHER PUBLICATIONS

L. Dong et al. Intermodal Coupling by Periodic Microbending in Dual-Core Fibers—Comparison of Experiment and Theory. Journal of Lightwave Technology, 12:1:24-27, Jan. 1994. (Year: 1994).*

(Continued)

*Primary Examiner* — Michael Stahl
(74) *Attorney, Agent, or Firm* — Svetlana Z. Short

(57) ABSTRACT

A multi core optical fiber that includes a plurality of cores disposed in a cladding. The plurality of cores include a first core and a second core. The first core has a first propagation constant $\beta_1$, the second core has a second propagation constant $\beta_2$, the cladding has a cladding propagation constant $\beta_0$, and (I).

21 Claims, 15 Drawing Sheets

(56) References Cited

U.S. PATENT DOCUMENTS

| | | | |
|---|---|---|---|
| 5,144,690 A | 9/1992 | Domash | |
| 5,915,050 A * | 6/1999 | Russell | G02F 1/3131 385/96 |
| 6,430,342 B1 | 8/2002 | Kim et al. | |
| 6,611,648 B2 * | 8/2003 | Kumar | G02B 6/02042 385/126 |
| 2002/0146226 A1 * | 10/2002 | Davis | G02F 1/0115 385/24 |
| 2003/0209655 A1 | 11/2003 | Wang | |
| 2011/0243517 A1 * | 10/2011 | Kokubun | G02B 6/02042 385/123 |
| 2013/0156393 A1 | 6/2013 | Kokubun et al. | |
| 2014/0199039 A1 * | 7/2014 | Kokubun | G02B 6/46 29/428 |
| 2016/0097903 A1 * | 4/2016 | Li | G02B 6/02042 385/50 |
| 2017/0123236 A1 | 5/2017 | Barad et al. | |

FOREIGN PATENT DOCUMENTS

| | | |
|---|---|---|
| CN | 1272180 A | 11/2000 |
| CN | 105022117 A | 11/2015 |
| CN | 105676347 A | 6/2016 |
| CN | 106656332 A | 5/2017 |
| JP | 2017-009629 A | 1/2017 |

OTHER PUBLICATIONS

I. H. Malitson. Interspecimen Comparison of the Refractive Index of Fused Silica. Journal of the Optical Society of America, 55:10: 1205-1209, Oct. 1965. (Year: 1965).*

L. Dong et. al. Dual-core Fibre Intermodal Coupler by Mechanical Gratings. Conference on Applied Optics and Optoelectronics, Leeds, United Kingdom, Sep. 1992. (obtained via https://eprints.soton.ac.uk/379773/) (Year: 1992).*

Bremer et al., "Grating assisted optical waveguide coupler to excite individual modes of a multi-mode waveguide", In Optics Communications, vol. 356, 2015, pp. 560-564.

Gan et al., "Spatial-Division Multiplexed Mach-Zehnder Interferometers in Heterogeneous Multicore Fiber for Multiparameter Measurement" in IEEE Photonics Journal, vol. 8, No. 1, Feb. 2016, 9 pages.

Wang et al., "Spatially Arrayed Long Period Gratings in Multicore Fiber by Programmable Electrical Arc Discharge" In in IEEE Photonics Journal, vol. 9, No. 1, Feb. 2017, 11 pages.

Fernandes et al., "Switching in multicore fibers using flexural acoustic waves", Optics Express, vol. 23, No. 20, Oct. 5, 2015, p. 26313, XP055672407.

International Search Report and Written Opinion of the International Searching Authority; PCT/US19/60247; dated Mar. 13, 2020; 12 Pages; European Patent Office.

Chinese Patent Application No. 201980084582.7, Office Action, dated Dec. 2, 2022, 6 pages Chinese Patent Office.

* cited by examiner

US 11,921,366 B2

OPTICAL SYSTEMS COMPRISING MULTI-CORE OPTICAL FIBERS FOR REALIZING DIRECT CORE TO CORE COUPLING

CROSS-REFERENCE TO RELATED APPLICATION

This application claims the benefit of priority under 35 U.S.C. § 371 of International Application No. PCT/US2019/060247, filed on Nov. 7, 2019, which claims the benefit of priority under 35 U.S.C. § 119 of U.S. Provisional Application Ser. No. 62/770,249 filed on Nov. 21, 2018, the content of which is relied upon and incorporated herein by reference in its entirety.

BACKGROUND

The present disclosure relates to optical systems comprising multicore optical fibers. More specifically, the present disclosure relates optical systems comprising multicore optical fibers having at least two cores with differing propagating constants that, in combination with a long period fiber grating facilitates direct core to core coupling.

SUMMARY

According to the subject matter of the present disclosure a multicore optical fiber includes a plurality of cores disposed in a cladding. The plurality of cores include a first core and a second core. The first core has a first propagation constant $\beta_1$, the second core has a second propagation constant $\beta_2$, the cladding has a cladding propagation constant $\beta_0$, and $$\frac{|\beta_1 - \beta_2|}{|\beta_2 - \beta_0|} < \frac{1}{2}.$$

In accordance with one embodiment of the present disclosure, a multicore optical fiber includes a plurality of cores disposed in a cladding. The plurality of cores include a first core, a second core, and a third core. The first core has a first propagation constant $\beta_1$, the second core has a second propagation constant $\beta_2$, the third core has a third propagation constant $\beta_3$, the cladding has a cladding propagation constant $\beta_0$, and $$\frac{|\beta_1 - \beta_2|}{|\beta_2 - \beta_0|} < \frac{1}{2}.$$

The first core and the second core also have a modal mismatch $M_{12}$ and $$M_{12} = \frac{|\beta_1 - \beta_2|}{2C_{12}}$$

where $C_{12}$ is a coupling coefficient for coupling from the first core to the second core and $M_{12}$ is greater than 10.

In accordance with another embodiment of the present disclosure, a method of coupling light from a first core of a multicore optical fiber to a second core of the multicore optical fiber includes directing a plurality of photons generated by a photon generator optically coupled to an input end of the multicore optical fiber having a plurality of cores disposed in a cladding into the first core of the plurality of cores. The plurality of cores include the first core and the second core. The first core has a first propagation constant $\beta_1$, the second core has a second propagation constant $\beta_2$, the cladding has a cladding propagation constant $\beta_0$, and $$\frac{|\beta_1 - \beta_2|}{|\beta_2 - \beta_0|} < \frac{1}{2}.$$

The method also includes engaging the multicore optical fiber with a modulator, thereby generating a long period fiber grating having a grating period $\Omega$ in the multicore optical fiber, where $(2\pi)/(|\beta_1-\beta_2|)=\Omega$ such that the first core is coupled with the second core.

Although the concepts of the present disclosure are described herein with primary reference to quantum communication, it is contemplated that the concepts will enjoy applicability to any methods of optical communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
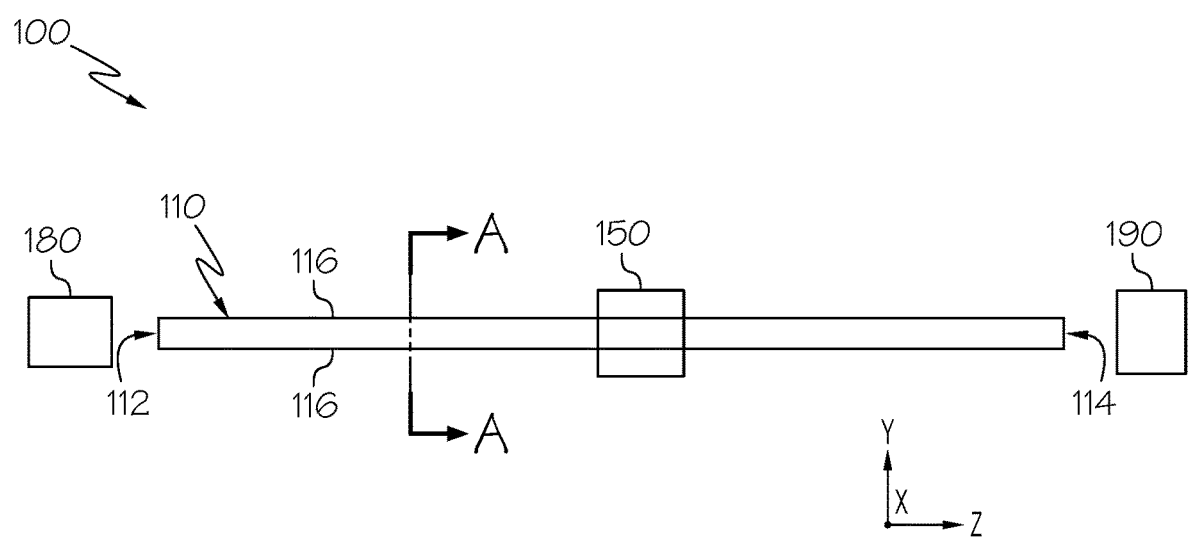
FIG. 1 schematically depicts an optical system including a photon generator, a multicore optical fiber, a modulator, and a photon detector, according to one or more embodiments shown and described herein.

Controlled coupling of light in an optical network with many spatial modes (for example, thousands of spatial modes) has important applications in optical switching networks, optical computing, and quantum communications, for example, quantum random walks. In quantum applications, controlled coupling of light with low propagation loss and low decoherence is critical for the development and implementation of quantum algorithms and quantum simulations. Current mediums for controlled coupling of light include silicon photonic circuits and glass waveguides. However, these mediums face significant problems such as high propagation loss due to surface roughness added during fabrication, as well as high coupling loss due to mismatch of the refractive index of the medium to the refractive index of the input and output pathways (e.g., optical fibers). Multicore optical fiber is an alternative medium with low propagation loss, and negligible coupling loss. However, in previous implementations, multicore optical fiber was too rigid a medium and making controlled coupling between different cores difficult. Thus, improved multi-core optical fibers and optical systems for controlled coupling are desired.

Reference will now be made in detail to embodiments of an optical system comprising a multicore optical fiber having a plurality of cores disposed in a cladding. The multicore optical fiber is configured to facilitate direct and selective core to core coupling between two of the plurality of cores. The optical system may further comprise a modulator configured to generate a long period fiber grating in the multicore optical fiber. The long period fiber grating comprises periodic alteration of the refractive index of multiple cross sections of the multicore optical fiber to facilitate selective core to core coupling. For example, the plurality of cores comprise a first core having a first propagation constant, a second core having a second propagation constant (and in some embodiments, additional cores which may comprise the first propagation constant, the second propagation constant, other propagation constants, and combinations thereof), and the cladding having a cladding propagation constant. The first propagation constant, the second propagation constant, and the cladding propagation constant are configured such that minimal direct core to core coupling occurs between the first core and the second core without the presence of a long period fiber grating and both direct core-to core coupling and minimal direct core to cladding coupling occur when a long period fiber grating having a particular period is generated in the multicore optical fiber.

Without intending to be limited by theory, the difference between the first and second propagation constants isolates the first and second cores, without the presence of the long period fiber grating, due to phase mismatch. This reduces the effect of environmental perturbation (such as core diameter fluctuation and core relative position along the length of the fiber) and allows for closely packed cores within the multicore optical fiber without undesired coupling between cores or between the cores and the cladding. Moreover, generating the long period fiber grating in the multicore optical fiber, for example, on demand using the modulator, facilitates selective direct core to core coupling, for example, between the first core and the second core. Collectively, the optical system described herein provides an optical platform for a variety of applications, such as an optical switching network, optical computing, and quantum random walks with minimal loss while achieving arbitrary optical coupling (i.e., switching).

Referring now to FIG. 1, an optical system 100 comprising a multicore optical fiber 110 with a plurality of cores 120 (FIG. 2A), a photon generator 180, a photon detector 190, and a modulator 150 is schematically depicted. The multicore optical fiber 110 comprises an input end 112 optically coupled to the photon generator 180 and an output end 114 optically coupled to the photon detector 190. In operation, the photon generator 180 may selectively direct photons into any individual core of the plurality of cores 120. For example, the photon generator 180, the input end 112 of the multicore optical fiber 110, or both, are coupled to a translatable stage, such as an automated 3-axis stage, which is configured to align the photon generator 180 with any individual core of the plurality of cores 120. For example, the photon generator 180 may be aligned with a first core 120a (FIG. 2A) and may direct a plurality of photons into the first core 120a. The multicore optical fiber 110 also comprises an outer surface 116 and the modulator 150 is engageable with the multicore optical fiber 110, for example, with the outer surface 116 of the multicore optical fiber 110. As described in more detail below, engaging the modulator 150 with the multicore optical fiber 110 generates one or more long period fiber gratings 130 (FIG. 2B) in the multicore optical fiber 110.

Figure 2A:
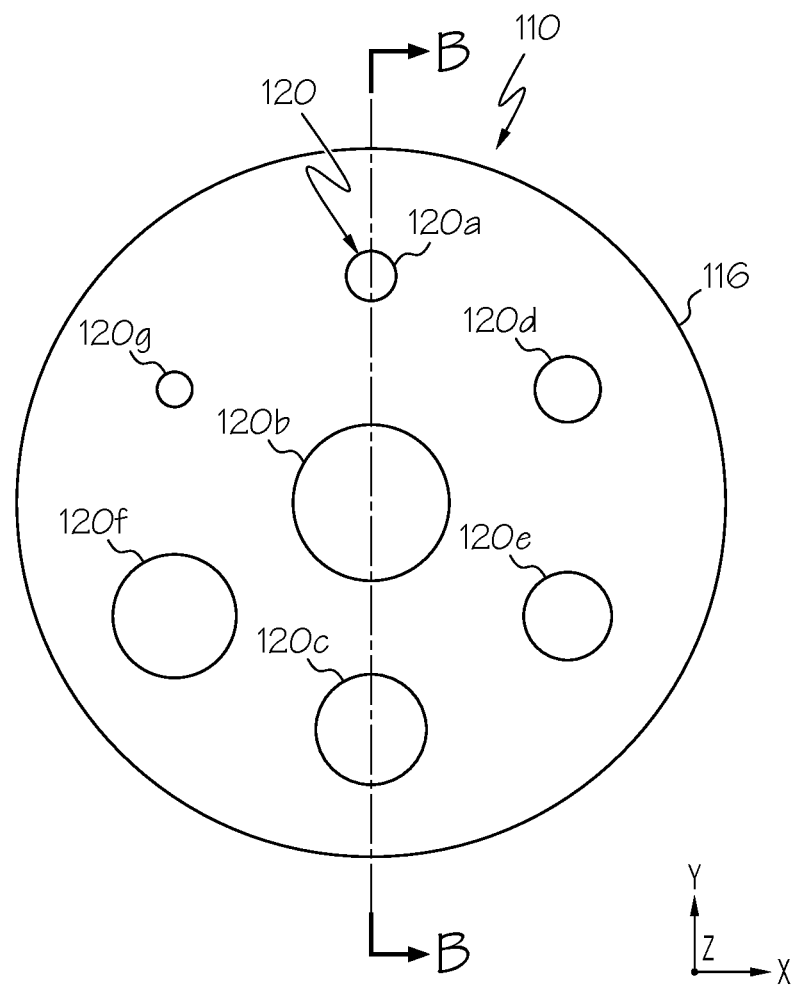
FIG. 2A schematically depicts an X-Y cross-section of the multicore optical fiber of FIG. 1 along section A-A, according to one or more embodiments shown and described herein.

Referring now to FIG. 2A, which depicts an X-Y cross-section of the multicore optical fiber 110 along section A-A of FIG. 1, the multicore optical fiber 110 comprises a plurality of cores 120 disposed in a cladding 125. Each core of the plurality of cores 120 comprises a single mode fiber, for example, single mode step index fiber. In addition, each core of the plurality of cores 120 comprises a propagation constant. Without intending to be limited by theory, the propagation constant of a core (or other waveguide) determines how the amplitude and phase of light propagating in the core with a given frequency varies along a propagation direction. The propagation constant depends on a number of factors, such as the refractive index of the core and the diameter of the core, and the wavelength of light propagating in the core. In the embodiment depicted in FIG. 2A, each core 120 comprises a different propagation constant β, for example, a first core 120a comprises a first propagation constant $β_1$, a second core 120b comprises a second propagation constant $β_2$, a third core 120c comprises a third propagation constant $β_3$, a fourth core 120d comprises a fourth propagation constant $β_4$, a fifth core 120e comprises a fifth propagation constant $β_5$, the sixth core 120f comprises a sixth propagation constant $β_6$, and a seventh core 120g comprises a seventh propagation constant $β_7$.

While the embodiment depicted in FIG. 2A comprises seven cores (i.e., cores 120a-120g), the multicore optical fiber 110 may comprise any plurality of cores in which at least two cores have differing propagation constants. Moreover, while each core 120a-120g depicted in FIG. 2A comprises a different propagation constant, it should be understood that embodiments of the multicore optical fiber 110 having at least two cores with the same propagation constant, such that plurality of cores 120 include three or more cores, are contemplated. For example, FIGS. 6A-6D depict various arrangements of cores that include one or more first cores 120a (i.e., cores comprising the first propagation constant), one or more second cores 120b (i.e., cores comprising the second propagation constant), and, in some embodiments, one or more third cores 120c (i.e., cores comprising the third propagation constant).

Referring still to FIG. 2A, various properties of the cladding 125 and the plurality of cores 120 will be described in more detail. Some properties are discussed with reference to an "individual core," and are applicable to any individual core (e.g., cores 120a-120g) of the plurality of cores 120. Other properties discussed characterize a relationship between at least two cores. For ease of explanation and understanding, the first core 120a and the second core 120b are used in these descriptions. However, it should be understood that these properties may apply to any two cores of the plurality of cores 120.

Without intending to be limited by theory, the refractive index contrast Δ between an individual core of the plurality of cores 120 and the cladding 125 of the multicore optical fiber 110 is $$\frac{n_{core}^2 - n_{clad}^2}{2n_{core}^2},$$

where $n_{core}$ is the refractive index of the individual core and $n_{clad}$ is the refractive index of the cladding 125. A normalized frequency parameter V of the individual core is defined as $V=ρk_0(n_{core}^2-n_{clad}^2)^{1/2}$, where ρ is the radius of the individual core and $k_0$ is the wavenumber of the individual core. Each individual core also comprises dimensionless modal parameters U and W which are related to the normalized frequency parameter V by the function $U^2+W^2=V^2$, where $U=ρ(n_{core}^2k_0^2-β)^{1/2}$, $W=ρ(β^2-n_{clad}^2k_0^2)^{1/2}$, and β is the propagation constant of the individual core, which can be derived from the function $U^2+W^2=V^2$. Moreover, the HE11 mode (e.g., the fundamental mode) equation for an individual core is $$U\frac{J_1(U)}{J_0(U)} = W\frac{K_1(W)}{K_0(W)},$$

where $J_0$ is the zero-order Bessel J-function, $J_1$ is the first order Bessel J-function, $K_0$ is the zero-order Bessel K-function, and $K_1$ is the first-order Bessel K-function.

As shown mathematically by the normalized frequency parameter V and dimensionless modal parameters U and W, two cores that comprise different refractive indices, different diameters, or both may comprise different propagation constants β. For example, the first core 120a comprises a first diameter and a first refractive index and the second core 120b comprises a second diameter and a second refractive index. To achieve differing propagation constants β (i.e., the first propagation constant $β_1$ and the second propagation constant $β_2$), the first diameter may be different than the second diameter, the first refractive index may be different than the second refractive index, or both the diameters and the refractive indexes of the first core 120 and the second core 120b may be different. In addition, the cladding 125 comprises a cladding propagation constant $β_0$ where $β_0=n_{clad}*2π/λ$ and λ is the free-space wavelength of light propagating in the multicore optical fiber 110.

While still not intending to be limited by theory, fields of the waves (e.g., light waves) propagating in the multicore optical fiber 110 may be coupled, for example, selectively coupled, when certain conditions are met. For example, the plurality of cores 120 of the multicore optical fiber 110 may be characterized by a plurality of coupling coefficients (i.e., various coupling coefficients for coupling from one individual core, such as the first core 120a, to another individual core, such as the second core 120b). While not intending to be limited by theory, coupling coefficients measure the amount of overlay between the modal fields of two cores of the plurality of cores 120, such as the first core 120a and the second core 120b. Modal fields of the cores depend on various parameters, such as the radius of the core, the refractive index of the core, the material of the core, the material of the cladding, and the wavelength of operation (k) (i.e., the wavelength of light propagating in the core).

For example, using the coupled mode equations and assuming all wave fields are concentrated within the fundamental modes of two cores (e.g., the first core 120a and the second core 120b), the following condition is met:

$$E(x, y, z) = b_1(z)\frac{e_1(x, y)}{\sqrt{N_1}} + b_2(z)\frac{e_2(x, y)}{\sqrt{N_2}},$$

where E(x,y,z) is the tangential E-field of the multicore optical fiber 110, $b_1$ is the amplitude of a beam propagating in the first core 120a as a function of the beam's position (z) in the beam propagating direction, $b_2$ is the amplitude of a beam propagating in the second core 120b as a function of the beam's position (z) in the beam propagation direction, $e_1$ is the eigenmode of the first core 120a, $e_2$ is the eigenmode of the second core 120b, $N_1$ is the normalization of the first core 120a and $N_2$ is the normalization of the second core 120b. The normalization $N_i$ of an individual core of the multicore optical fiber 110 is defined as $$N_i = \frac{n_{co}}{2}\left(\frac{\varepsilon_0}{\mu_0}\right)^{\frac{1}{2}}\int_A e_i^2 dA,$$

where $n_{co}$ is the refractive index of the individual core, $\varepsilon_0$ is the vacuum permittivity, $\mu_0$ is vacuum permeability, $e_i$ is the eigenmode of the individual core, and A is the area of the multicore optical fiber 110. Furthermore, without intending to be limited by theory, in some embodiments, the eigenmodes $e_1$ and $e_2$ are the tangential eigenmodes of the first core 120 and the second core 120b, respectively.

Moreover, under perturbation theory, $$\frac{db_1}{dz} - i(\bar{\beta}_1 + \bar{C}_{11})b_1 = i\bar{C}_{12}b_2,$$

where $\bar{C}_{11}$ is the self-coupling coefficient for the first core 120a, $\bar{C}_{12}$ is the coupling coefficient for coupling light from the first core 120a to the second core 120b (sometimes called a "cross coupling coefficient") and $$\frac{db_2}{dz} - i(\bar{\beta}_2 + \bar{C}_{22})b_2 = i\bar{C}_{21}b_1,$$

where $\bar{C}_{22}$ is the self-coupling coefficient for the second core 120b, and $\bar{C}_{21}$ is the coupling coefficient for coupling light from the second core 120b to the first core 120a. The self-coupling coefficients $\bar{C}_{11}$ and $\bar{C}_{22}$ are negligible compared with the cross coupling coefficients $\bar{C}_{12}$ and $\bar{C}_{21}$. Furthermore, the coupling coefficient for coupling an individual core with another individual core is $$C_{ij} = \frac{1}{4} \frac{k}{\sqrt{N_i N_j}} \left(\frac{\varepsilon_0}{\mu_0}\right)^{\frac{1}{2}} \int_A (n^2 - n_i^2) e_i e_j dA,$$

$$n(x, y) = \begin{cases} n_{core,1}, & (x, y) \text{ is inside core 1} \\ n_{core,2}, & (x, y) \text{ is inside core 2} \\ n_{clad}, & (x, y) \text{ is outside core 1 and core 2} \end{cases} ; \text{ and}$$

$$n_i(x, y) = \begin{cases} n_{core,i}, & (x, y) \text{ is inside core } i \\ n_{clad}, & (x, y) \text{ is outside core } i \end{cases}$$

For cores that are nearly identical (such as cores that have the same propagation constant) $C_{12} \approx C_{21} \equiv C$. Moreover, the maximum power transferred from one core to another core (e.g., from the first core 120a to the second core 120b) when the condition $C_{12} \approx C_{21} \equiv C$ is met is $$F^2 = \frac{1}{1 + \frac{(\beta_1 - \beta_2)^2}{4C^2}},$$

where $F^2$ is the maximum power transferred from one core to another. It should be understood that the above description of the coupling coefficient $C_{ij}$ is applicable to any two cores of the multicore optical fiber 110 when no long period fiber grating 130 is generated in the multicore optical fiber 110. For example, the coupling coefficient $C_{12}$ for coupling light from the first core 120a to the second core 120b without the long period fiber grating 130 is $$C_{12} = \frac{1}{4} \frac{k}{\sqrt{N_1 N_2}} \left(\frac{\varepsilon_0}{\mu_0}\right)^{\frac{1}{2}} \int_A (n^2 - n_1^2) e_i e_j dA.$$

Figure 2B:
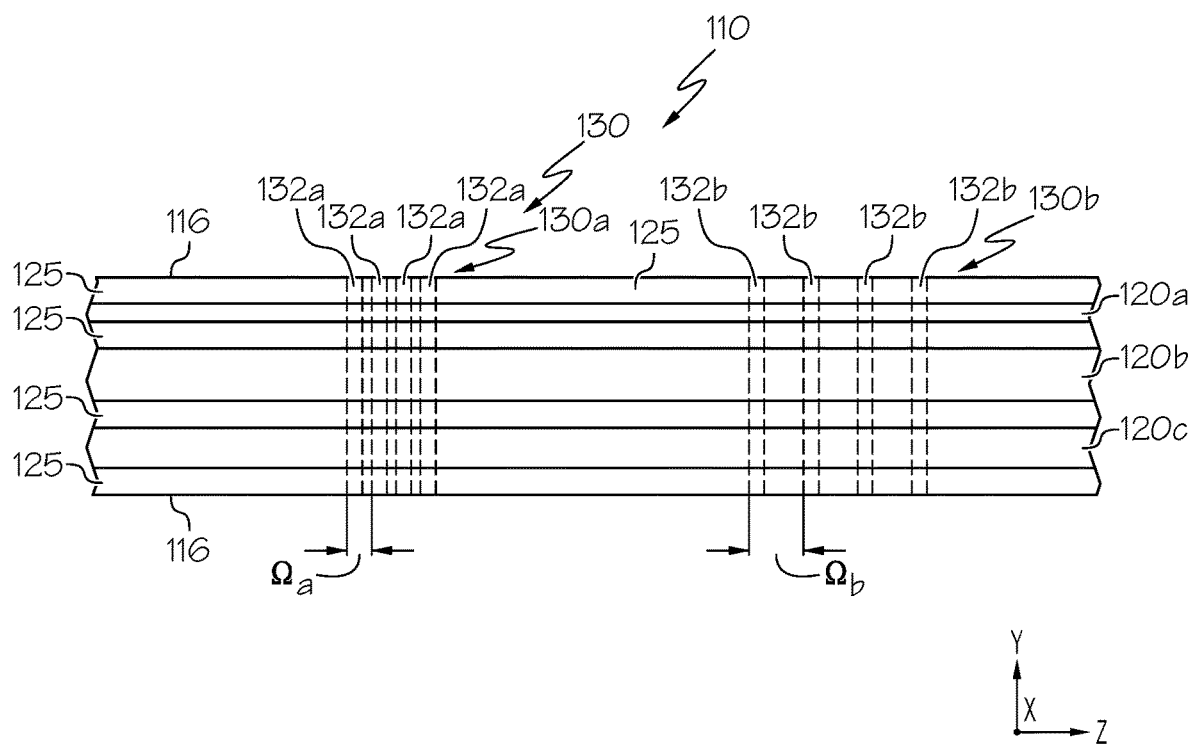
FIG. 2B schematically depicts an Y-Z cross-section of the multicore optical fiber of FIG. 1 along section B-B having a first long period fiber grating having a first grating period and a second long period fiber grating having a second grating period, according to one or more embodiments shown and described herein.

Referring now to FIGS. 1-2B, the modulator 150 of the optical system 100 is engageable with the multicore optical fiber 110 to generate the long period fiber grating 130 in the multicore optical fiber 110 to facilitate direct core-to core coupling between cores, such as the first core 120a and the second core 120b. Without intending to be limited by theory, "long period fiber grating" refers to a periodic cross-sectional perturbation of the refractive index of an optical fiber, such as the multicore optical fiber 110. In conventional single mode optical fibers, a long period fiber grating couples the core mode of an individual core to the cladding mode of the cladding, facilitating direct core to cladding coupling. As used herein, "direct core to cladding coupling" refers to direct coupling of a cladding mode to a core mode through perturbation of refractive index. However, in the embodiments described herein, the multicore optical fiber 110 and the modulator 150 are configured such that long period fiber gratings 130 generated in the multicore optical fiber 110 facilitate direct core to core coupling of two cores having differing propagation constants. As used herein, "direct core to core coupling" refers to direct coupling of a core mode of one core to a core mode of another core through perturbation of refractive index.

As described above, at least two of the plurality of cores 120 (such as the first core 120a and the second core 120b) comprise differing propagation constants β, which isolate the cores due to phase mismatch, reducing the effect of environmental perturbation (such as core diameter fluctuation, core relative position) compared with traditional multicore fiber. In addition, differing propagation constants β allow the plurality of cores 120 to be closely packed within the cladding 125 (i.e., have a spacing distance from a center of an individual core to the nearest neighboring core that is small, for example, about 30 µm or less, 25 µm or less, 20 µm or less, 15 µm or less, 10 µm or less, 5 µm or less, such as from 1 µm to 30 µm, from 1 µm to 20 µm, from 5 µm to 15 µm, or the like) without detrimental coupling.

Furthermore, a modal mismatch M between two cores, for example, the first core 120a and the second core 120b is defined as $$M_{12} = \frac{(\beta_1 - \beta_2)}{2C_{12}}$$

and it should be understood that this equation applies to any two cores of the plurality of cores 120. The larger the modal mismatch M between two cores, the less direct core to core coupling occurs between those cores without the presence of the long period fiber grating 130. In some embodiments, the modal mismatch M between at least two of the plurality of cores 120 of the multicore optical fiber 110 (for example, the first core 120a and the second core 120b) may be greater than 5 (e.g., M>5). For example, in some embodiments, M>5, M>8, M>10, M>12, M>15, M>20, M>50, or the like.

Referring still to FIGS. 1-2B, engaging the modulator 150 with the multicore optical fiber 110 generates the long period fiber grating 130. The long period fiber grating 130 comprises a plurality of altered index regions 132 and a grating period Ω. The plurality of altered index regions 132 are cross-sectional regions of the multicore optical fiber 110 in which the refractive index of the plurality of cores 120 and the refractive index of the cladding 125 are altered. Furthermore, while each grating period Ω is depicted in FIG. 2B as encompassing an altered index region 132 adjacent an region without a change in refractive index, in some embodiments, each grating period Ω may encompass two adjacent altered index regions in which one altered index region comprises a refractive index increase and the other altered index region comprises a refractive index decrease, where the refractive index increase has the same absolute value as the refractive index decrease. An example of this embodiment is described below with respect to FIGS. 7-9. In operation, when $(2\pi)/(|\beta_i-\beta_j|)=\Omega$, an individual core comprising a propagating constant $\beta_i$ is coupled to an individual core comprising a propagation constant $\beta_j$, via direct core to core coupling. For example, when $(2\pi)/(|\beta_1-\beta_2|)=\Omega$, the first core 120a is coupled with the second core 120b (i.e., via direct core to core coupling). In some embodiments, the grating period SZ an individual altered index region 132, where the refractive index of the cores 120 and cladding 125 of the multicore optical fiber As an illustrative example, FIG. 2B is a Y-Z cross-section of the multicore optical fiber 110, along section B-B of FIG. 2A and schematically depicts a first long period fiber grating 130a and a second long period fiber grating 130b. The first long period fiber grating 130a comprises a plurality of first altered index regions 132a and a first grating period $\Omega_a$ and the second long period fiber grating 130b comprises a plurality of second altered index regions 132b and a second grating period $\Omega_b$. The first long period fiber grating 130a is configured to couple the first core 120a to the second core 120b via direct core to core coupling. In particular, the first grating period $\Omega_a=(2\pi)/(|\beta_1-\beta_2|)$. Further, the second long period fiber grating 130b is configured to couple the second core 120b to the third core 120c via direct core to core coupling. In particular, the second grating period $\Omega_b=(2\pi)/(|\beta_2-\beta_3|)$. It should be understood that the long period fiber grating 130 may be selectively configured using the modulator 150 to generate a grating period SZ to couple (via direct core to core coupling) any one individual core of the plurality of cores 120 with any one other individual core of the plurality of cores 120.

In some embodiments, the multicore optical fiber 110 is configured to minimize direct core to cladding coupling. When the relationship $$\frac{|\beta_i - \beta_j|}{|\beta_j - \beta_0|}$$

between the between the propagation constants of an individual core having a propagation constant $\beta_i$, an individual core having a propagation core $\beta_j$), and the cladding 125 (i.e., $\beta_0$) of the multicore optical fiber 110 is minimized, direct core to cladding coupling is minimized when the long period fiber grating 130 is generated in the multicore optical fiber 110. In some embodiments, at least two cores of the plurality of cores 120 and the cladding 125 (an individual core having a propagation constant $\beta_i$, an individual core having a propagation core $\beta_j$), and the cladding 125 (i.e., $\beta_0$) of the multicore optical fiber 110) may satisfy the relationship $$\frac{|\beta_i - \beta_j|}{|\beta_j - \beta_0|} < \frac{1}{8}, \frac{|\beta_i - \beta_j|}{|\beta_j - \beta_0|} < \frac{1}{4}, \frac{|\beta_i - \beta_j|}{|\beta_j - \beta_0|} < \frac{1}{2},$$

$$\frac{|\beta_i - \beta_j|}{|\beta_j - \beta_0|} < 1, \frac{|\beta_i - \beta_j|}{|\beta_j - \beta_0|} < \frac{3}{2}, \frac{|\beta_i - \beta_j|}{|\beta_j - \beta_0|} < 2,$$

or the like. As one example, the first core 120a and the second core 120b may satisfy the relationship $$\frac{|\beta_1 - \beta_2|}{|\beta_2 - \beta_0|} < \frac{1}{8}, \frac{|\beta_1 - \beta_2|}{|\beta_2 - \beta_0|} < \frac{1}{4}, \frac{|\beta_1 - \beta_2|}{|\beta_2 - \beta_0|} < \frac{1}{2},$$

$$\frac{|\beta_1 - \beta_2|}{|\beta_2 - \beta_0|} < 1, \frac{|\beta_1 - \beta_2|}{|\beta_2 - \beta_0|} < \frac{3}{2}, \frac{|\beta_1 - \beta_2|}{|\beta_2 - \beta_0|} < 2,$$

or the like. As another example, the second core 120b and the third core 120c may satisfy the relationship $$\frac{|\beta_2 - \beta_3|}{|\beta_3 - \beta_0|} < \frac{1}{8}\frac{|\beta_2 - \beta_3|}{|\beta_3 - \beta_0|} < \frac{1}{4}, \frac{|\beta_2 - \beta_3|}{|\beta_3 - \beta_0|} < \frac{1}{2},$$

$$\frac{|\beta_2 - \beta_3|}{|\beta_3 - \beta_0|} < 1, \frac{|\beta_2 - \beta_3|}{|\beta_3 - \beta_0|} < \frac{3}{2}, \frac{|\beta_2 - \beta_3|}{|\beta_3 - \beta_0|} < 2,$$

or the like. As still another example, the first core 120a and the third core 120c satisfy the relationship $$\frac{|\beta_1 - \beta_3|}{|\beta_3 - \beta_0|} < \frac{1}{8}\frac{|\beta_1 - \beta_3|}{|\beta_3 - \beta_0|} < \frac{1}{4}, \frac{|\beta_1 - \beta_3|}{|\beta_3 - \beta_0|} < \frac{1}{2},$$

$$\frac{|\beta_1 - \beta_3|}{|\beta_3 - \beta_0|} < 1, \frac{|\beta_1 - \beta_3|}{|\beta_3 - \beta_0|} < \frac{3}{2}, \frac{|\beta_1 - \beta_3|}{|\beta_3 - \beta_0|} < 2,$$

or the like.

Furthermore, the difference in optical power transfer between cores of the multicore optical fiber 110 with and without the long period fiber grating 130 may be characterized by an extinction ratio. As used herein, the "extinction ratio" refers to a ratio of the optical power transferred between two cores (such as the first core 120a and the second core 120b) when the long period fiber grating 130 is present (i.e., generated) in the multicore optical fiber 110 and when the long period fiber grating 130 is not present in the multicore optical fiber 110. In some embodiments, the extinction ratio may comprise about 10 dB or greater, for example 15 dB or greater, 20 dB or greater, 25 dB or greater, 30 dB or greater, or the like. The extinction ratio for two cores (e.g., the an individual core having a propagation constant $\beta_i$, an individual core having a propagation core $\beta_j$) is 20 dB or greater when M>10 and $$\frac{|\beta_i - \beta_j|}{|\beta_j - \beta_0|} < \frac{1}{2}.$$

For example the extinction ratio for the first core 120a and the second core 120b is 20 dB or greater when $M_{12}>1$ and $$\frac{|\beta_1 - \beta_2|}{|\beta_2 - \beta_0|} < \frac{1}{2}.$$

Without intending to be limited by theory, when two cores (e.g., the first core 120a and the second core 120b) are highly mismatched (e.g., when two cores comprise a modal mismatch M greater than 10), the following conditions are met $$\beta_A - \beta_B \approx |\beta_1 - \beta_2|\left(1 + \frac{1}{2M^2}\right),$$

-continued $$e_A(x, y) = e_1(x, y) + \frac{1}{2M}e_2(x, y), \text{ and}$$

$$e_B(x, y) = e_2(x, y) - \frac{1}{2M}e_1(x, y),$$

where $e_1$ is the eigenmode of the first core 120a, $e_2$ is the eigenmode of the second core 120b, $e_A$ is the superposition of the eigenmodes $e_1$ and $e_2$ that is predominantly concentrated in the first core 120a, and $e_B$ is the superposition of the eigenmodes $e_1$ and $e_2$ that is predominantly concentrated in the second core 120b. These superpositions $e_A$ and $e_B$ are sometimes referred to as "supermodes." Assuming arbitrarily periodic perturbation, the change in refractive index induced by the long period fiber grating 130 may be defined as $\delta n (x,y,z) = \overline{\delta n}(x,y) \cos(\Omega z+\Phi)$. Further, operating under perturbation theory and using the supermodes $e_A$ and $e_B$ as the basis modes, $$\frac{db_A}{dz} - i\beta_A b_A = iC_{AB}b_B\cos(\Omega z + \Phi) \text{ and}$$

$$\frac{db_B}{dz} - i\bar{\beta}_B b_B = iC_{BA}b_A\cos(\Omega z + \Phi),$$

where the coupling strength between supermodes is defined by the coupling coefficient $C_{AB}$, where $$C_{AB} = \frac{k}{\sqrt{N_A N_B}} \int_{A_\infty} \overline{\delta n}(x, y) e_A e_B dA$$

and $N_\alpha = \int_{A_\infty} e_+^2 dA$, with $\alpha=A$, B. Under the rotating wave approximation, and assuming $b_A(0)=1$, $b_B(0)=0$, the following conditions are satisfied:

$$b_A(z) = e^{i\bar{\beta}z}e^{\frac{1}{2}\Omega z}[\cos(\Omega_R z) + i\sin\theta\sin(\Omega_R z)] \text{ and } b_B(z) =$$

$$e^{-i\phi}e^{i\bar{\beta}z}e^{-\frac{1}{2}i\Omega z}i\cos\theta\sin(\Omega_R z),$$

where $\bar{\beta}$ is the average propagation constant of the plurality of cores 120 and $$\bar{\beta} = \frac{\beta_A + \beta_B}{2},$$

and $\Delta\omega=\beta_A-\beta_B-\Omega$ is the detuning, $\Omega_R$ is the Rabi oscillation frequency and $$\Omega_R = \frac{1}{2}\sqrt{C_{AB}^2 + \Delta\omega^2}, \text{ and } \tan\theta = \frac{\Delta\omega}{C_{AB}}.$$

In addition, the maximum power transfer from core A to core B is $F^2=\cos^2\theta$, where $$\cos\theta = \left(1 + \left(\frac{\Delta\omega}{C_{AB}}\right)^2\right)^{-\frac{1}{2}}.$$

In addition, two cores (i.e., core "A" and core "B") of the multicore optical fiber 110 may be characterized an overall device dimension L. As used herein, "overall device dimension" refers to the total length of the grating coupling region. The overall device dimension is mathematically defined as $$L = \frac{\pi}{C_{AB}}.$$

Reducing the overall device dimension, for example, by increasing the coupling coefficient $C_{AB}$, may minimize direct core to core coupling when the long period fiber grating 130 is not present and may minimize direct core to cladding coupling when the long period fiber grating 130 is present. For example, the overall device dimension L may be less than 50 cm, less than 40 cm, less than 30 cm, less than 20 cm, less than 10 cm, or the like. For example the overall device dimension L may be from about 1 cm to about 50 cm, from about 1 cm to about 40 cm, from about 1 cm to about 30 cm, or the like.

Figure 3:
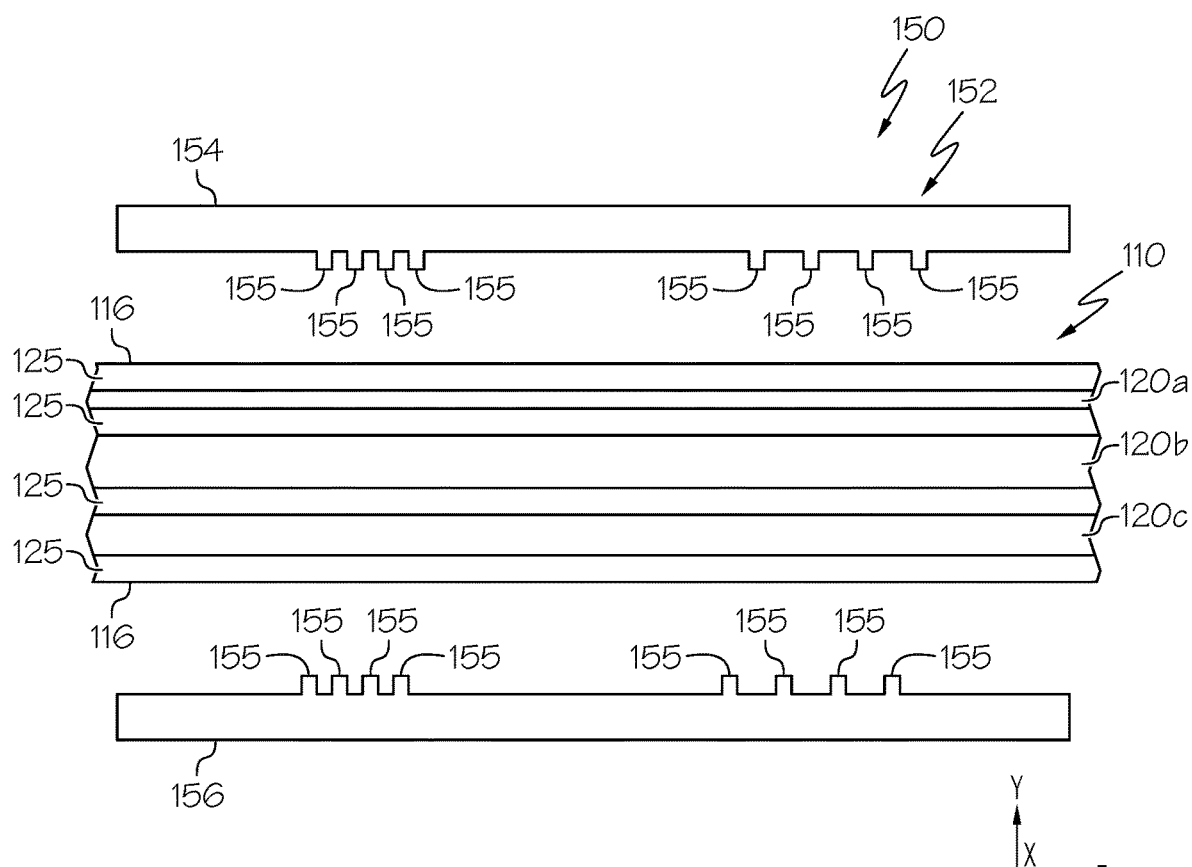
FIG. 3 schematically depicts an embodiment of the modulator of FIG. 1 comprising a mechanical modulator, according to one or more embodiments shown and described herein.

Referring now to FIG. 3, in some embodiments, the modulator 150 comprises a mechanical modulator 152 that is physically engageable with the multicore optical fiber 110. The mechanical modulator 152 is structurally configured to apply mechanical pressure to the multicore optical fiber 110 (i.e., to an outer surface 116 of the multicore optical fiber 110) to temporarily produce a periodic refractive index alteration in the multicore optical fiber 110. By "temporarily" it should be understood that the refractive index alteration occurs when mechanical pressure is applied to the outer surface 116 of the multicore optical fiber 110 and that the refractive index alteration is removed when mechanical pressure is removed from the outer surface 116 of the multicore optical fiber 110.

In some embodiments, for example, the embodiment depicted in FIG. 3, the mechanical modulator 152 comprises a first plate portion 154 and a second plate portion 156. The first plate portion 154, the second plate portion 156, or both, may comprise one or more teeth 155 spaced periodically such that, when the teeth 155 engage with the outer surface 116 of the multicore optical fiber 110, the teeth 155 apply mechanical pressure to the multicore optical fiber 110 and generate a temporary refractive index alteration at these periodically spaced locations in the multicore optical fiber 110. In some embodiments, the first plate portion 154, the second plate portion 156, or both, are translatable inward toward one another to apply pressure to the outer surface 116 of the multicore optical fiber 110. In some embodiments, the teeth 155 are translatable into and away from contact with the outer surface 116 of the multicore optical fiber 110 independent of motion of the first plate portion 154, the second plate portion 156, or both. In one example embodiment, the mechanical modulator 152 comprises a vertical gear rack configured to apply a periodic force onto the multicore optical fiber 110. In some embodiments, the first plate portion 154, the second plate portion 156 and the teeth 155 are components of the vertical gear rack. Motion of the vertical gear rack (e.g., motion into and away from contact with the multicore optical fiber 110) may be controlled by a linear motorized stage. Moreover, the mechanical modulator 152 may further comprise one or more load cells for measuring the force applied to the multicore optical fiber 110 by the mechanical modulator 152.

While not intending to be limited by theory, the temporary refractive index alteration generated by the applied mechanical pressure is due to the photo-elastic response of the glass of the multicore optical fiber 110. For example, the teeth 155 of the mechanical modulator 152 cause microbending and periodical pressure points in the multicore optical fiber 110 which modulate the refractive index of one or more the plurality of cores 120. In some embodiments, the teeth 155 comprise squared contact surface and in some embodiments the teeth 155 comprise rounded contact surface. However, it should be understood that teeth 155 comprising any shape are contemplated. Moreover, while the first plate portion 154 and the second plate portion 156 of the mechanical modulator 152 of FIG. 3 each comprise teeth 155, it should be understood that the mechanical modulator 152 may comprise any mechanical assembly configured to mechanically stress the multicore optical fiber 110 in a periodic manner.

Figure 4:
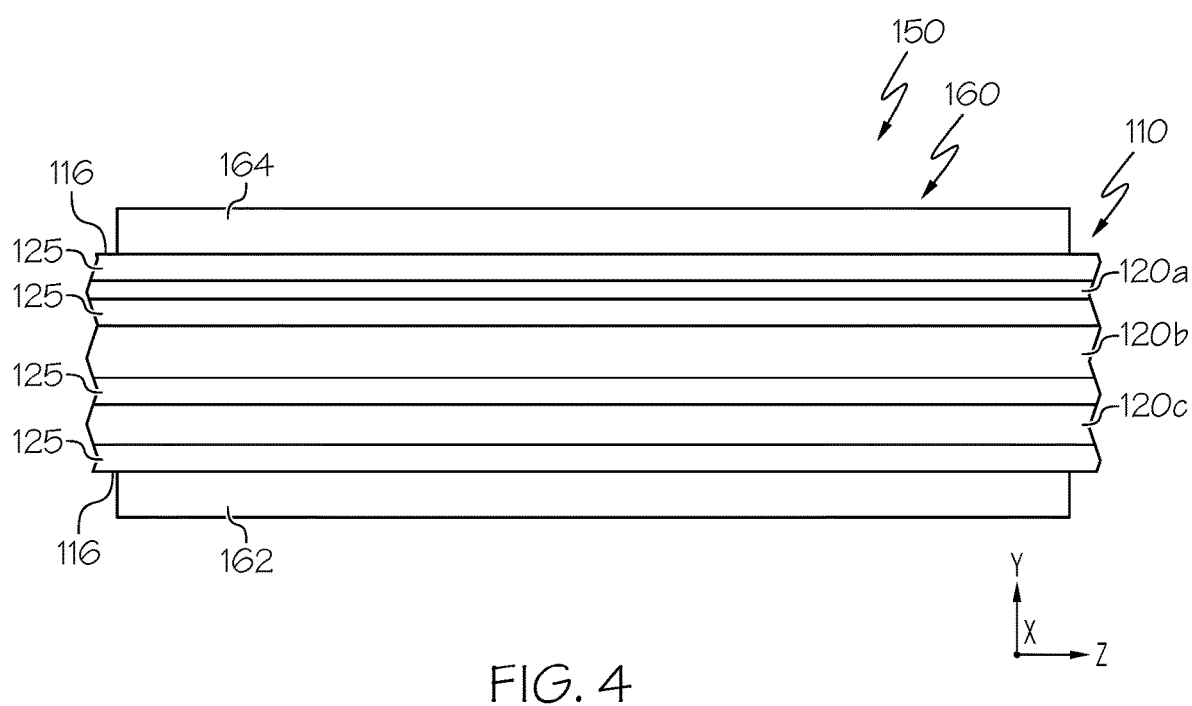
FIG. 4 schematically depicts an embodiment of the modulator of FIG. 1 comprising an acousto-optic modulator, according to one or more embodiments shown and described herein.

Referring now to FIG. 4, in some embodiments, the modulator 150 comprises an acousto-optic modulator 160. The acousto-optic modulator 160 comprises a piezoelectric transducer 162 and an absorber 164. It should be understood that while both the piezoelectric transducer 162 and the absorber 164 are depicted in FIG. 4, some embodiments may comprise the piezoelectric transducer 162 without the absorber 164. As depicted in FIG. 4, the acousto-optic modulator 160 may be coupled to the multicore optical fiber 110 such that both the piezoelectric transducer 162 and the absorber 164 are coupled to the outer surface 118 of the multicore optical fiber 110. In operation, the piezoelectric transducer 162 is configured to vibrate, which creates sound waves in the material of the multicore optical fiber 110. Without intending to be limited by theory, the sound wave velocity in optical fiber (such as the multicore optical fiber 110) is on the order of about 3.5 km/s and thus the modulating frequency is about 3 MHz. Further, in embodiments comprising the absorber 164, the absorber 164 absorbs sound waves generated by the piezoelectric transducer 162 after the soundwaves have traversed a cross section of the multicore optical fiber 110, limiting reflections which could cause undesired refractive index alterations.

While not intending to be limited by theory, the acousto-optic modulator 160 may generate the long period fiber grating 130 in the multicore optical fiber 110 based on the acousto-optic effect, which is the alteration of the refractive index of a transparent material (such as the material of the multicore optical fiber 110) due to the oscillating mechanical pressure applied to the transparent material by the sound waves generated by the acousto-optic modulator 160, for example, the piezoelectric transducer 162 of the acousto-optic modulator 160. While still not intending to be limited by theory, sound waves generated by the acousto-optic modulator 160 operate as moving periodic planes of expansion and compression that temporarily change the index of refraction of the multicore optical fiber 110. Further, the acousto-optic modulator 160 is tunable such that the amplitude and frequency of sound waves generated in the multicore optical fiber 110 by the acousto-optic modulator 160 may be adjusted, which may adjust the long period fiber grating 130 generated in the multicore optical fiber 110, for example the grating period Ω of the long period fiber grating 130, the polarization of the acoustic wave (i.e., the direction of vibration), or the like. This adjustability allows a user to control and change which cores 120 are coupled.

Figure 5A:
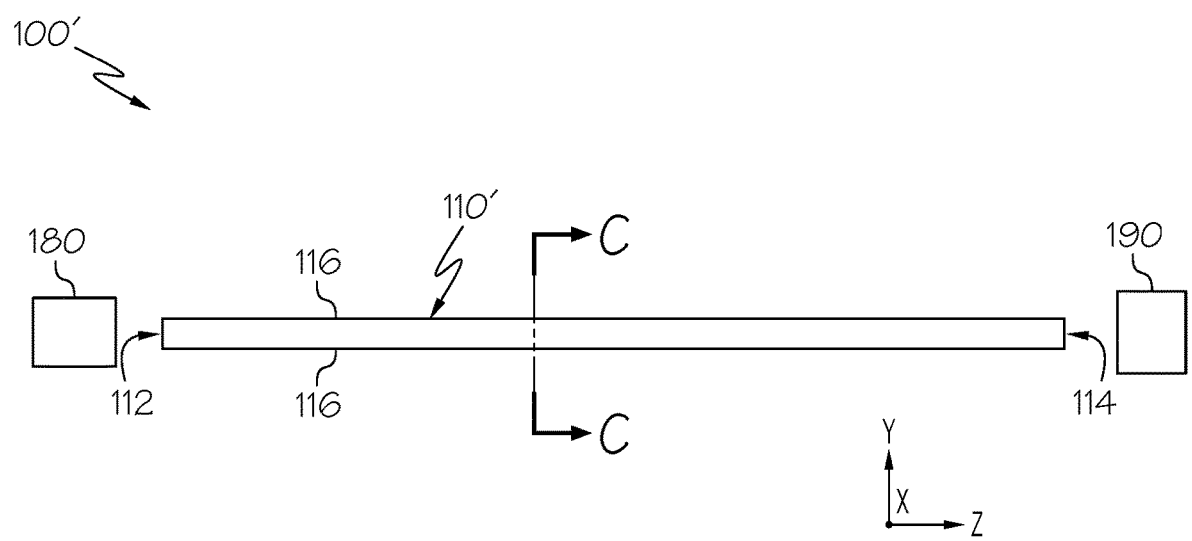
FIG. 5A schematically depicts an optical system including a photon generator, a multicore optical fiber having one or more fixed long period fiber gratings, and a photon detector, according to one or more embodiments shown and described herein.
Figure 5B:
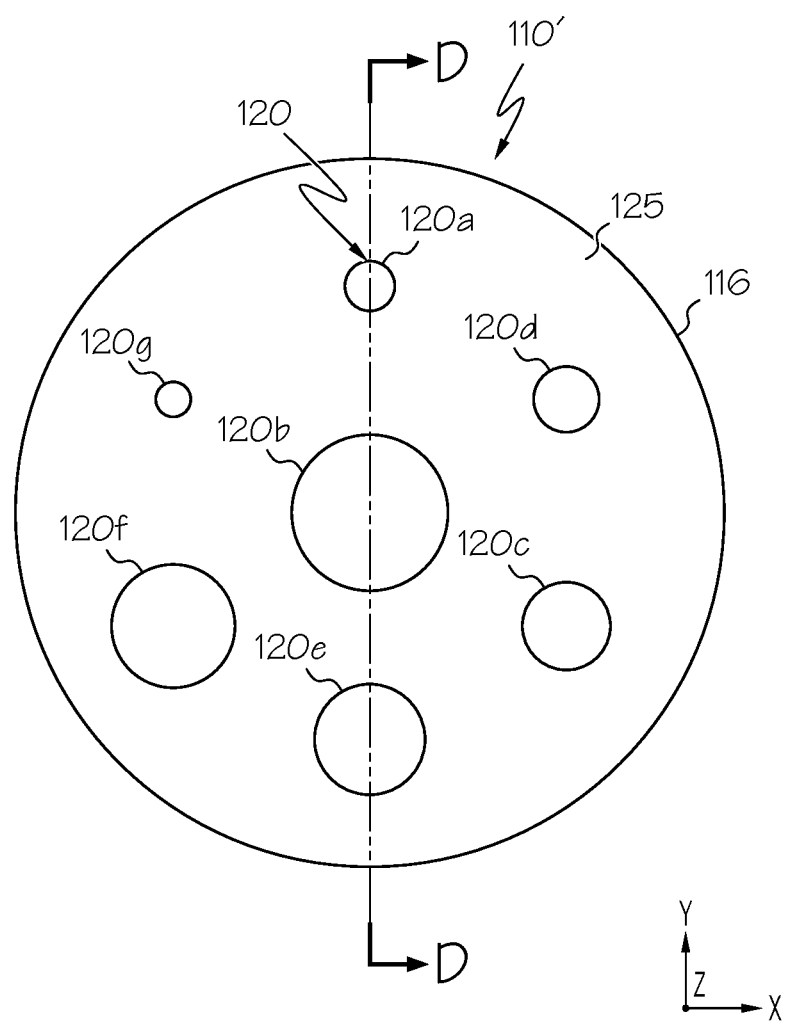
FIG. 5B schematically depicts an X-Y cross-section of the multicore optical fiber of FIG. 5A along section C-C, according to one or more embodiments shown and described herein.
Figure 5C:
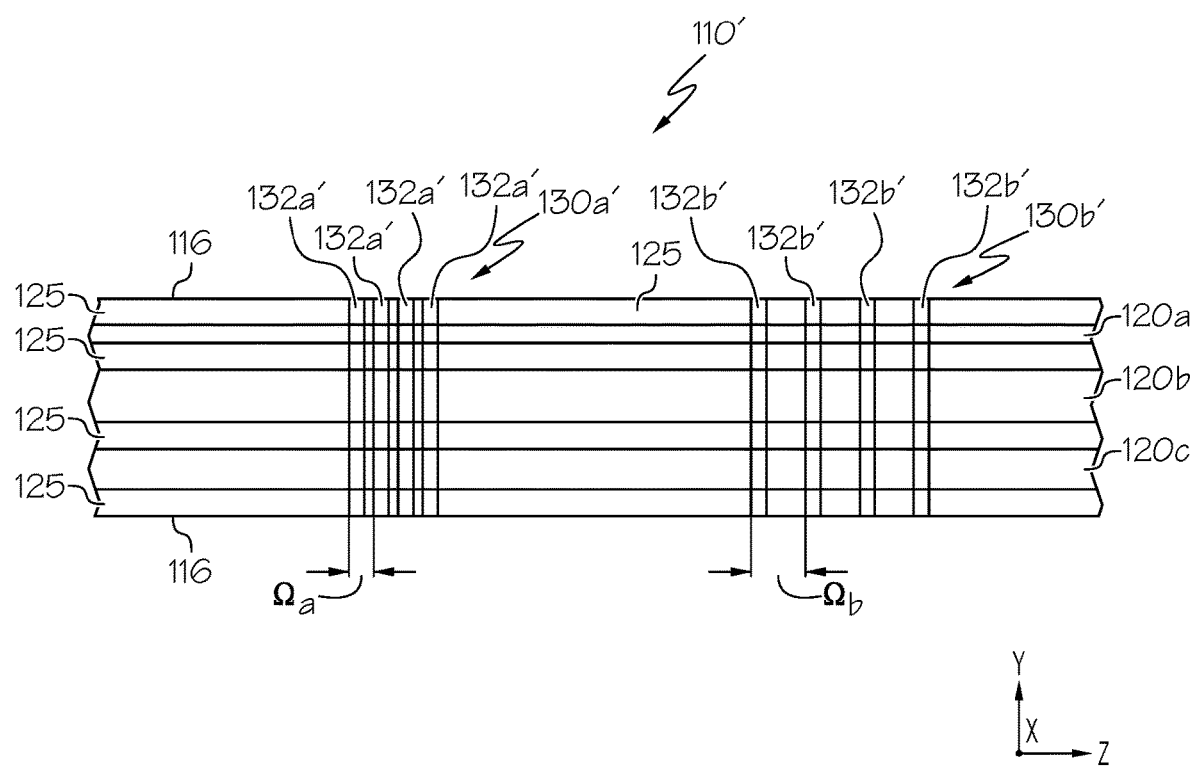
FIG. 5C schematically depicts an Y-Z cross-section of the multicore optical fiber of FIG. 5A along section D-D having a first fixed long period fiber grating having a first grating period and a second fixed long period fiber grating having a second grating period, according to one or more embodiments shown and described herein.

Referring now to FIGS. 5A-5C, an optical system 100' comprising a multicore optical fiber 110' having a fixed long period fiber grating 130' that is fixed in the multicore optical fiber 110' is depicted. In the embodiments described above with respect to FIGS. 1-4, the long period fiber grating 130 is a temporary long period fiber grating selectively and removable generated by the modulator 150. In contrast, the fixed long period fiber grating 130' of the multicore optical fiber 110' is fixed in the multicore optical fiber 110'. For example, the fixed long period fiber grating 130' may be formed by any known or yet to be developed fiber grating manufacturing technique, such as chemical etching, laser irradiation (e.g., UV laser irradiation), or the like, to selectively alter the refractive index of the multicore optical fiber 110' and form the fixed long period fiber grating 130' in the multicore optical fiber 110'. FIG. 5B depicts an X-Y cross-section of the multicore optical fiber 110' along section C-C of FIG. 5A, which comprises a plurality of cores 120a-120f disposed in a cladding 125, similar to the multicore optical fiber 110 of FIGS. 1-4.

Referring now to FIG. 5C, a Y-Z cross-section of the multicore optical fiber 110', along section D-D of FIG. 5B is schematically depicted. FIG. 5C includes a first fixed long period fiber grating 130a' and a second fixed long period fiber grating 130b'. The first fixed long period fiber grating 130a' comprises a plurality of first fixed altered index regions 132a' and a first grating period $\Omega_a$ and the second fixed long period fiber grating 130b' comprises a plurality of second fixed altered index regions 132b' and a second grating period $\Omega_b$. The first fixed long period fiber grating 130a' is configured to couple the first core 120a to the second core 120b via direct core to core coupling. In particular, the first grating period $\Omega_a=(2\pi)/(|\beta_1-\beta_2|)$. Further, the second fixed long period fiber grating 130b' is configured to couple the second core 120b to the third core 120c via direct core to core coupling. In particular, the second grating period $\Omega_b=(2\pi)/(|\beta_2-\beta_3|)$. It should be understood that fixed long period fiber grating 130' may be configured to with any grating period $\Omega$ to couple (via direct core to core coupling) any one individual core of the plurality of cores 120 with any one other individual core of the plurality of cores 120.

Referring now to FIGS. 6A-6D, a multicore optical fiber 220 comprising an outer surface 216 and a plurality of cores 220 disposed in a cladding 225 in a core array 221 is schematically depicted. Each of FIGS. 6A-6D depicts a different example core array 221 having one or more first cores 220a, each comprising the first propagation constant $\beta_1$, one or more second cores 220b, each comprising the second propagation constant $\beta_2$ and, in some embodiments (FIGS. 6B-6D), one or more third cores 220c each comprising the third propagation constant $\beta_3$. Each core array 221 comprises at least three cores 220. Further, the cores 220 of each core array 221 are arranged within the cladding 225 of the multicore optical fiber 210 such that a nearest neighboring core of each individual core comprises a different propagation constant than the individual core. In embodiments in which an individual core comprises multiple nearest neighboring cores (i.e., the nearest neighboring cores are spaced apart from the individual core by the same spacing distance), each of the multiple nearest neighboring cores comprises a different propagation constant than the individual core.

Figure 6A:
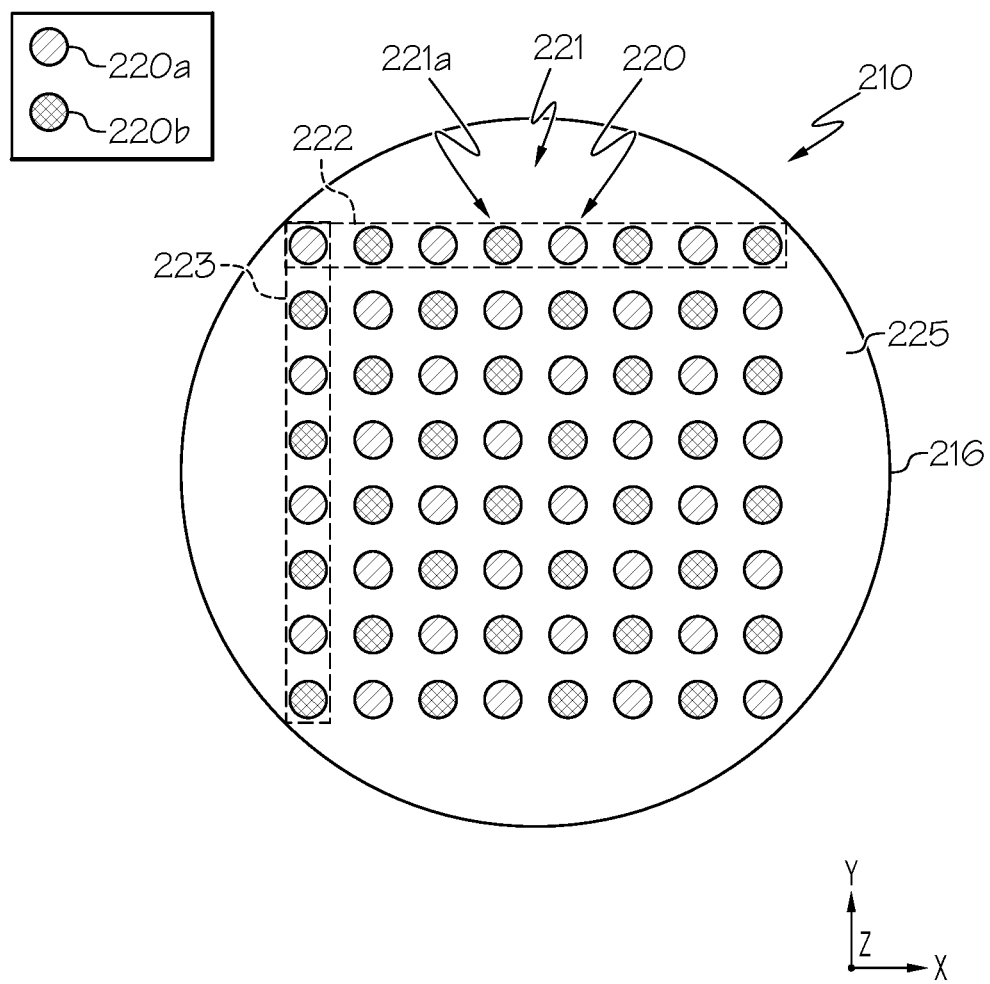
FIG. 6A schematically depicts an X-Y cross section of a multicore optical fiber comprising a first array of cores, according to one or more embodiments shown and described herein.

FIG. 6A depicts a first core array 221a having one or more first cores 220a and one or more second cores 220b. The first core array 221a comprises a plurality of rows 222 of cores 220 and a plurality of columns 223 of cores 220. Each row 222 of the first core array 221a alternates between an individual first core 220a and an individual second core 220b. Each column 223 of the first core array 221a alternates between an individual first core 220a and an individual second core 220b. Further, the cores 220 of each row 222 of the first core array 221a are aligned along the X-axis and the cores 220 of each column 223 of the first core array 221a are aligned along the Y-axis. Without intending to be limited by theory, the first core array 221a may facilitate controlled and simultaneous direct core to core coupling of all cores (e.g., each first core 220a may be coupled to at least one second core 220 and/or each second core 220b may be coupled to at least one first core 220a) and may be used to implement a controlled two-dimensional quantum walk.

Figure 6B:
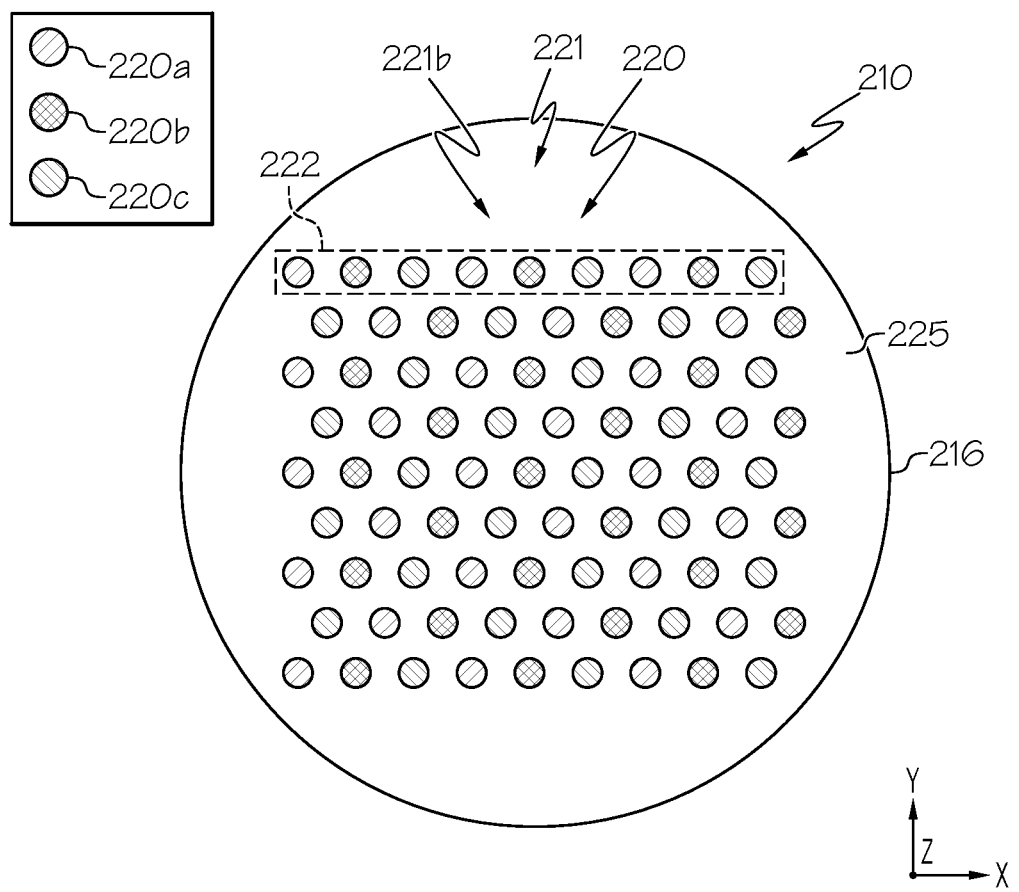
FIG. 6B schematically depicts an X-Y cross section of a multicore optical fiber comprising a second array of cores, according to one or more embodiments shown and described herein.

FIG. 6B depicts a second core array 221b having one or more first cores 220a, one or more second cores 220b, and one or more third cores 220c. The first core array 221a comprises a plurality of rows 222 and each row is laterally offset (i.e., in the X-direction) from its adjacent rows. Further, the cores 220 of each row 222 alternate between the first core 220a, the second core 220b and the third core 220c such that in any individual row, at least two cores are positioned between cores having the same propagation constant. Without intending to be limited by theory, the second core array 221b facilitates the simulation of a two-dimensional triangular lattice and a graphene lattice.

Figure 6C:
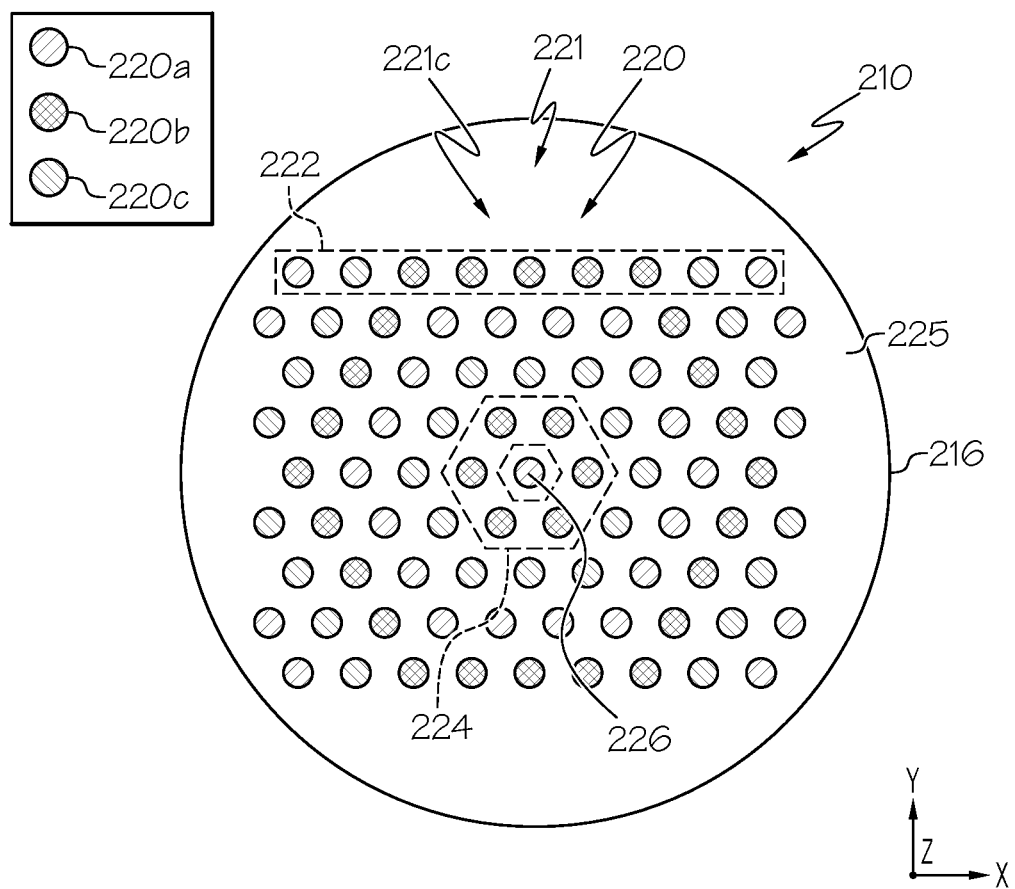
FIG. 6C schematically depicts an X-Y cross section of a multicore optical fiber comprising a third array of cores, according to one or more embodiments shown and described herein.

FIG. 6C depicts a third core array 221c having one or more first cores 220a, one or more second cores 220b, and one or more third cores 220c. The third core array 221c comprises a plurality of rows 222 and each row is laterally offset (i.e., in the X-direction) from its adjacent rows. Further, third core array 221c comprises a central core 226 and a plurality of rings 224 of cores 220 concentrically disposed outward from the central core 226. The cores 220 of each ring 224 in the third core array 221c comprise the same propagation constant and concentrically adjacent rings 224 of cores 220 comprise different propagation constants. For example, the cores 220 of each ring 224 alternate between the first core 220a, the second core 220b and the third core 220c such that for any individual ring 224, at least two rings 224 are concentrically positioned between rings 224 having cores 220 of the same propagation constant. Without intending to be limited by theory, the third core array 221c facilitates controlled direct core to core coupling in the radial direction and facilitates simulation of a bandgap fiber.

Figure 6D:
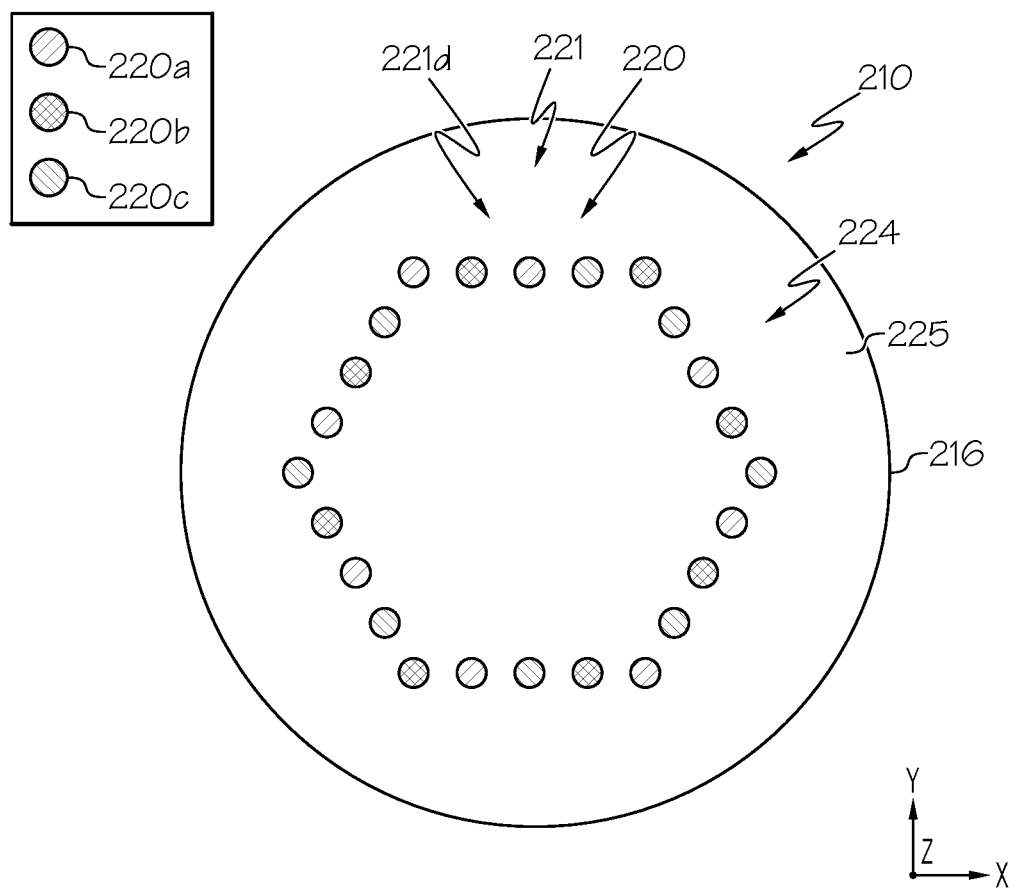
FIG. 6D schematically depicts an X-Y cross section of a multicore optical fiber comprising a fourth array of cores, according to one or more embodiments shown and described herein.

FIG. 6D depicts a fourth core array 221d having one or more first cores 220a, one or more second cores 220b, and one or more third cores 220c disposed in a single ring 224. The fourth core array 221d comprises a ring 224 of cores 220. The cores 220 the ring 224 of the fourth core array 221d alternate between the first core 220a, the second core 220b and the third core 220c such that at least two cores are positioned between cores having the same propagation constant. Without intending to be limited by theory, the fourth core array 221d facilitates the simulation of uni-directional direct core to core coupling of a one-dimensional array of cores in a circular fashion.

Referring again to FIGS. 1-6D, in operation, the optical system 100, 100' described herein may be used to couple light between cores of the multicore optical fiber 110. For example, a method of coupling light from the first core 120a of the multicore optical fiber 110 to the second core 120a of the multicore optical fiber 110 comprises directing a plurality of photons generated by the photon generator 180 into the input end 112 of the multicore optical fiber 110, for example, into the first core 120a at the input end 112 of the multicore optical fiber 110. The method also comprises engaging the multicore optical fiber 110 with the modulator 150, thereby generating the long period fiber grating 130 in the multicore optical fiber 110. The long period fiber grating 130 comprises the grating period $\Omega$ and $(2\pi)/(|\beta_1-\beta_2|)=\Omega$ such that the first core 120a is coupled with the second core 120a.

Thus, when the plurality of photons propagating in the first core 120a reach the long period fiber grating 130, at least some of the plurality of photons transfers from the first core 120a to the second core 120b and exit the second core 120b at the output end 114 of the multicore optical fiber 110. Next, the method comprises receiving the plurality of photons at the photon detector 190 and measuring the plurality of photons with the photon detector 190. Further, the long period fiber grating 130 generated by the modulator 150 is adjustable to facilitate coupling of any two cores of the plurality of cores 120, for example, by adjusting the grating period $\Omega$ of the long period fiber grating 130. In one example operation, the coupling strength of two cores of the plurality of cores 120 may be measured. When determining coupling strength, the photon generator 180 may comprise the narrow band laser or super luminescent diode and the photon detector 190 may comprise an optical spectrum analyzer. In another example operation, a quantum walk may be performed and may be used in the development of quantum algorithms and quantum simulations.

EXAMPLES

Figure 7:
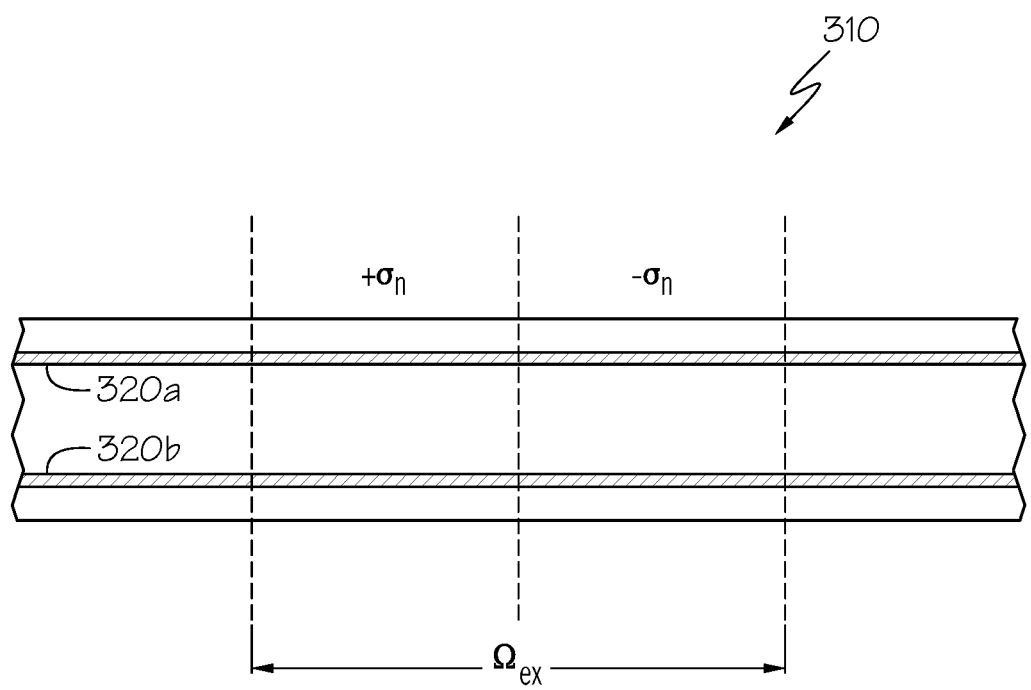
FIG. 7 schematically depicts an example multicore optical fiber having a first core and a second core, according to one or more embodiments shown and described herein.
Figure 8:
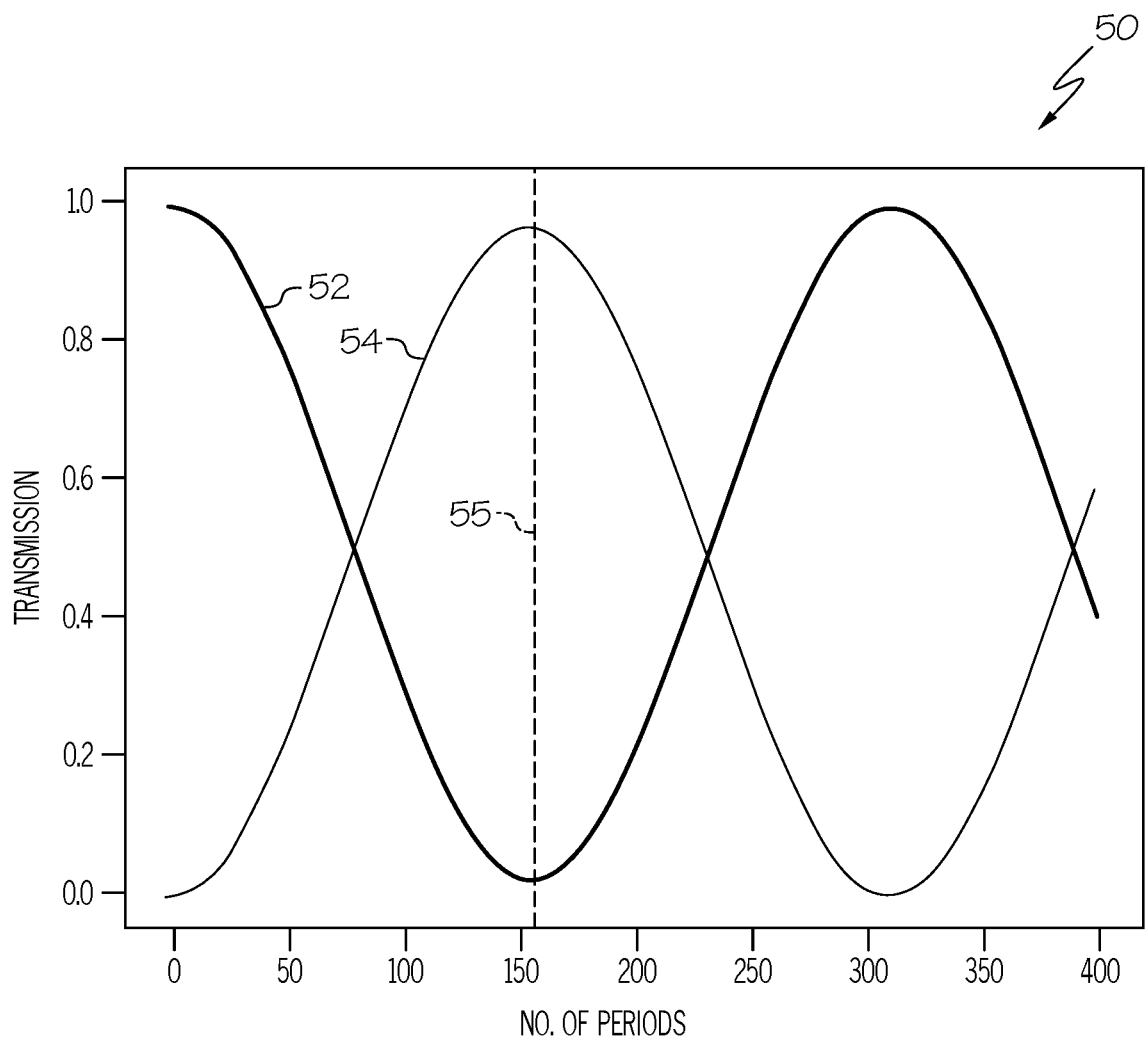
FIG. 8 graphically depicts the transmission between the cores of the multicore optical fiber of FIG. 7 along a number of grating periods for a single wavelength, according to one or more embodiments shown and described herein.
Figure 9:
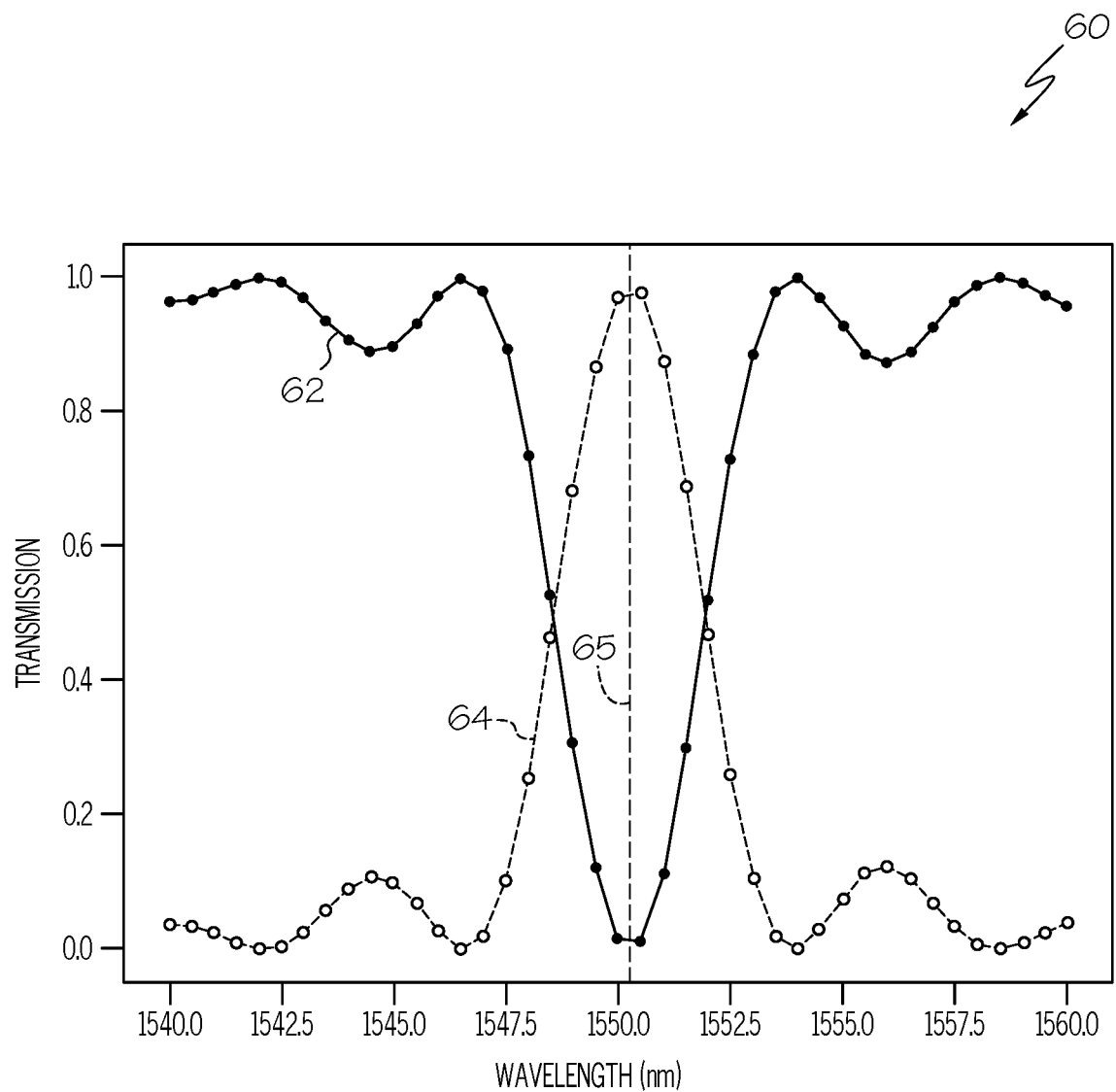
FIG. 9 graphically depicts the transmission between the cores of the multicore optical fiber of FIG. 7 along a range of wavelengths for a single grating period, according to one or more embodiments shown and described herein.

Referring now to FIGS. 7-9, in one example, the eigenmode expansion technique is used to numerically characterize the coupling between two individual cores having differing propagation constants (a first core 320a and a second core 320b) of an example multicore optical fiber 310. In this example, first core 320a comprises a propagation constant $\beta_1$ of 5.88968 $\mu m^{-1}$, the second core 320b comprises a propagation constant $\beta_2$ of 5.88472 $\mu m^{-1}$, and the spacing distance between the center of the first core 320 and the center of the second core 320b is 20 $\mu m$. In this example, an index change of $\pm\delta_n$ is induced in the first core 320a and the second core 320b across a grating period $\Omega_{ex}$ of 1278.263 $\mu m$. As depicted in FIG. 7, the grating period $\Omega_{ex}$ is divided in two equal halves of positive index change $\pm\delta_n$ and negative index change $-\delta_n$. The eigenmode expansion method may be used to find both the guided modes and unguided modes for each refractive index cross section (i.e., the $\pm\delta_n$ sections of the grating period $\Omega_{ex}$) of the first core 320a and the second core 320b. In particular, the eigenmode expansion method uses the continuity of tangential E and H fields in each refractive index cross section of the first core 320a and the second core 320b to determine the reflection coefficient and the transmission coefficient induced within the grating period $\Omega_{ex}$ (i.e., within a single grating period) and determine the scattering matrix for the grating period flex. Once the scattering matrix for a single period is obtained, the reflection coefficient and the transmission coefficient and scattering matrix can be determined for multiple grating periods (e.g., multiple iterations of the grating period $\Omega_{ex}$).

FIG. 8 depicts a graph 50 showing the transmission between the first core 320a and the second core 320b. Line 52 of graph 50 depicts the transmission from the second core 320b to the first core 320a and line 54 of graph 50 depicts the transmission from the first core 320a to the second core 320b. In particular, graph 50 shows that when a plurality of photons (i.e., light) comprising a wavelength of 1550 nm are directed into the first core 320a, maximal coupling of power from the first core 320a to the second core 320b is achieved after the light propagates through 156 grating periods $\Omega_{ex}$, as shown by line 55. In this example, the length of 156 periods corresponds to about 20 cm of coupling length. The coupling length and grating geometry in this example was designed to work for light with a wavelength of 1550 nm.

FIG. 9 depicts graph 60 showing the wavelength response of coupling at 156 grating periods $\Omega_{ex}$ along a wavelength range of 1540 nm and 1560 nm. Line 62 of graph 60 depicts the transmission from the second core 320b to the first core 320a at 156 grating periods $\Omega_{ex}$ along a wavelength range of 1540 nm and 1560 nm, measured in 0.5 nm increments. Line 64 of graph 60 depicts the transmission from the first core 320a to the second core 320b at 156 grating periods $\Omega_{ex}$ along a wavelength range of 1540 nm and 1560 nm, measured in 0.5 nm increments. Further, line 65 of graph 60 shows that maximal coupling is achieved at 1550 nm, which is in agreement with the measurements depicted in graph 50 of FIG. 8 and the predictions of the coupled mode equations.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A multicore optical fiber comprising:
a plurality of cores disposed in a cladding, wherein:
the plurality of cores comprise a first core and a second core; and
the first core comprises a first propagation constant $\beta_1$, the second core comprises a second propagation constant $\beta_2$, the cladding comprises a cladding propagation constant $\beta_0$, and $$\frac{|\beta_1 - \beta_2|}{|\beta_2 - \beta_0|} < \frac{1}{2}.$$

wherein:
the first core and the second core comprise a modal mismatch $M_{12}$;

$$M_{12} = \frac{|\beta_1 - \beta_2|}{2C_{12}}$$

where $C_{12}$ is a coupling coefficient for coupling from the first core to the second core; and
$M_{12}$ is greater than 10.

2. The multicore optical fiber of claim 1, wherein each core of the plurality of cores is a single mode core.

3. The multicore optical fiber of claim 1 wherein each core of the plurality of cores comprises a different propagation constant.

4. An optical system comprising:
the multicore optical fiber of claim 2; and
a modulator engageable with the multicore optical fiber, wherein:
engaging the modulator with the multicore optical fiber generates a long period fiber grating in the multicore optical fiber comprising a grating period $\Omega$; and
when $(2\pi)/(|\beta_1-\beta_2|)=\Omega$, the first core is coupled with the second core.

5. The optical system of claim 4, wherein the modulator comprises a mechanical modulator that is physically engageable with the multicore optical fiber to apply pressure to an outer surface of the multicore optical fiber.

6. The optical system of claim 5, wherein:
the mechanical modulator comprises a first plate portion and a second plate portion;
the first plate portion, the second plate portion, or both, comprise a plurality of periodically spaced teeth;
the first plate portion, the second plate portion, or both, are translatable toward one another; and
engaging the multicore optical fiber with the mechanical modulator comprises applying physical pressure to the multicore optical fiber using the first plate portion and the second plate portion.

7. The optical system of claim 4, wherein:
the modulator comprises an acousto-optic modulator;
the acousto-optic modulator comprises a piezoelectric transducer; and
engaging the multicore optical fiber with the acousto-optic modulator comprises generating a sound wave in the multicore optical fiber using the piezoelectric transducer.

8. The optical system of claim 4, further comprising a photon generator optically coupled to an input end of the multicore optical fiber and a photon detector optically coupled to an output end of the multicore optical fiber.

9. The multicore optical fiber of claim 1, further comprising a long period fiber grating comprising a grating period $\Omega$ wherein $(2\pi)/(|\beta_1-\beta_2|)=\Omega$.

10. The multicore optical fiber of claim 9, wherein an extinction ratio between the first core and the second core is 20 dB or greater.

11. The multicore optical fiber of claim 1 having a grating coupling region, wherein an overall device dimension of the multicore optical fiber is less than 30 cm.

12. The multicore optical fiber of claim 1, wherein:
the plurality of cores comprise at least three cores; and
the at least three cores include one or more first cores each having the first propagation constant $\beta_1$ and one or more second cores each having the second propagation constant $\beta_2$.

13. The multicore optical fiber of claim 12, wherein:
the at least three cores include one or more third cores each having a third propagation constant $\beta_3$; and
the third propagation constant $\beta_3$ is different than both the first propagation constant $\beta_1$ and the second propagation constant $\beta_2$.

14. The multicore optical fiber of claim 12, wherein the at least three cores are arranged within the cladding of the multicore optical fiber such that a nearest neighboring core of each individual core comprises a different propagation constant than the individual core.

15. A multicore optical fiber comprising:
a plurality of cores disposed in a cladding, wherein:
the plurality of cores comprise a first core, a second core, and a third core;
the first core comprises a first propagation constant $\beta_1$, the second core comprises a second propagation constant $\beta_2$, the third core comprises a third propagation constant $\beta_3$, the cladding comprises a cladding propagation constant $\beta_0$, and $$\frac{|\beta_1 - \beta_2|}{|\beta_2 - \beta_0|} < \frac{1}{2};$$

the first core and the second core comprise a modal mismatch $M_{12}$;

$$M_{12} = \frac{|\beta_1 - \beta_2|}{2C_{12}}$$

where $C_{12}$ is a coupling coefficient for coupling from the first core to the second core; and
$M_{12}$ is greater than 10.

16. The multicore optical fiber of claim 15, wherein:

$$\frac{|\beta_1 - \beta_3|}{|\beta_3 - \beta_0|} < \frac{1}{2};$$

$$\frac{|\beta_2 - \beta_3|}{|\beta_3 - \beta_0|} < \frac{1}{2};$$

the first core and the third core comprise a modal mismatch $M_{13}$;

$$M_{13} = \frac{|\beta_1 - \beta_3|}{2C_{13}},$$

where $C_{13}$ is a coupling coefficient for coupling from the first core to the third core;
the second core and the third core comprise a modal mismatch $M_{23}$;

$$M_{23} = \frac{|\beta_2 - \beta_3|}{2C_{23}},$$

where $C_{23}$ is a coupling coefficient for coupling from the second core to the third core; and
both $M_{13}$ and $M_{23}$ are greater than 10.

17. The multicore optical fiber of claim 15, wherein each core of the plurality of cores is a single mode core.

18. A method of coupling light from a first core of a multicore optical fiber to a second core of the multicore optical fiber, the method comprising:
directing a plurality of photons generated by a photon generator optically coupled to an input end of the multicore optical fiber comprising a plurality of cores disposed in a cladding into the first core of the plurality of cores, wherein:
the plurality of cores comprise the first core and the second core; and
the first core comprises a first propagation constant $\beta_1$, the second core comprises a second propagation constant $\beta_2$, the cladding comprises a cladding propagation constant $\beta_0$, and $$\frac{|\beta_1 - \beta_2|}{|\beta_2 - \beta_0|} < \frac{1}{2};$$

and
engaging the multicore optical fiber with a modulator, thereby generating a long period fiber grating comprising a grating period $\Omega$ in the multicore optical fiber, wherein $(2\pi)/(|\beta_1-\beta_2|)=\Omega$ such that the first core is coupled with the second core wherein:
the first core and the second core comprise a modal mismatch $M_{12}$;

$$M_{12} = \frac{|\beta_1 - \beta_2|}{2C_{12}}$$

where $C_{12}$ is a coupling coefficient for coupling from the first core to the second core; and
$M_{12}$ is greater than 10.

19. The method of claim 18, wherein the modulator comprises a mechanical modulator and engaging the multicore optical fiber with the mechanical modulator comprises applying physical pressure to an outer surface of the multicore optical fiber with the mechanical modulator.

20. The method of claim 18 wherein the modulator comprises an acousto-optic modulator comprising a piezoelectric transducer and engaging the multicore optical fiber with the acousto-optic modulator comprises generating a sound wave in the multicore optical fiber using the piezo-electric transducer.

21. A method of coupling light from a first core of a multicore optical fiber to a second core of the multicore optical fiber, the method comprising:

directing a plurality of photons generated by a photon generator optically coupled to an input end of the multicore optical fiber comprising a plurality of cores disposed in a cladding into the first core of the plurality of cores, wherein:

the plurality of cores comprise the first core and the second core; and the first core comprises a first propagation constant $\beta_1$, the second core comprises a second propagation constant $\beta_2$, the cladding comprises a cladding propagation constant $\beta_0$, and $$\frac{|\beta_1 - \beta_2|}{|\beta_2 - \beta_0|} < \frac{1}{2};$$

and engaging the multicore optical fiber with a modulator, thereby generating a long period fiber grating comprising a grating period $\Omega$ in the multicore optical fiber, wherein $(2\pi)/(|\beta_1-\beta_2|)=\Omega$ such that the first core is coupled with the second core wherein:

the plurality of cores comprise at least three cores;

the at least three cores include one or more first cores each having the first propagation constant $\beta_1$, one or more second cores each having the second propagation constant $\beta_2$, and one or more third cores each having a third propagation constant $\beta_3$;

the third propagation constant $\beta_3$ is different than both the first propagation constant $\beta_1$ and the second propagation constant $\beta_2$; and the at least three cores are arranged within the cladding of the multicore optical fiber such that a nearest neighboring core of each individual core comprises a different propagation constant than the individual core.

\* \* \* \* \*

UNITED STATES PATENT AND TRADEMARK OFFICE
CERTIFICATE OF CORRECTION

PATENT NO. : 11,921,366 B2
APPLICATION NO. : 17/295512
DATED : March 5, 2024
INVENTOR(S) : Rostislav Radiyevich Khrapko et al.

It is certified that error appears in the above-identified patent and that said Letters Patent is hereby corrected as shown below:

In the Claims

In Column 18, Lines 13-15, in Claim 1, delete "$\frac{|\beta_1 - \beta_2|}{|\beta_2 - \beta_0|} < \frac{1}{2}$." and insert --$\frac{|\beta_1 - \beta_2|}{|\beta_2 - \beta_0|} < \frac{1}{2}$--.

Signed and Sealed this
Twenty-third Day of July, 2024

*Katherine Kelly Vidal*
Katherine Kelly Vidal
*Director of the United States Patent and Trademark Office*